(12) United States Patent
Ikeda

(10) Patent No.: US 11,722,804 B2
(45) Date of Patent: *Aug. 8, 2023

(54) IMAGING DEVICE AND IMAGING SYSTEM HAVING A STACKED STRUCTURE FOR PIXEL PORTION AND SIGNAL PROCESSING CIRCUIT PORTION

(71) Applicant: SONY SEMICONDUCTOR SOLUTIONS CORPORATION, Kanagawa (JP)

(72) Inventor: Noritaka Ikeda, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/646,056

(22) Filed: Dec. 27, 2021

(65) Prior Publication Data

US 2022/0124274 A1 Apr. 21, 2022

Related U.S. Application Data

(63) Continuation of application No. 17/052,700, filed as application No. PCT/JP2019/019193 on May 14, 2019, now Pat. No. 11,228,729.

(30) Foreign Application Priority Data

May 15, 2018 (JP) .................................. 2018-093445

(51) Int. Cl.
*H04N 5/232* (2006.01)
*H04N 25/79* (2023.01)
(Continued)

(52) U.S. Cl.
CPC ............. *H04N 25/79* (2023.01); *H04N 23/80* (2023.01); *H04N 25/74* (2023.01)

(58) Field of Classification Search
CPC ............. H04N 5/23229; H04N 5/2353; H04N 5/23254
See application file for complete search history.

(56) References Cited

U.S. PATENT DOCUMENTS

2002/0063777 A1 5/2002 Maekawa et al.
2002/0154226 A1* 10/2002 Gohda ................... H04N 5/772
386/E5.072
(Continued)

FOREIGN PATENT DOCUMENTS

JP 2012-511963 A 5/2012
JP 2013-026787 A 2/2013
(Continued)

OTHER PUBLICATIONS

Kitani, et al., "Development of Data Communication Method In vehicle Network for Automated Driving", IPSJ Transactions on Consumer Devices & Systems, ISSN 2186-5728, vol. 6, No. 2, Sep. 22, 2016, pp. 13-51.

(Continued)

*Primary Examiner* — Hung H Lam
(74) *Attorney, Agent, or Firm* — Chip Law Group

(57) ABSTRACT

The need for miniaturizing camera modules is to be effectively satisfied. There are provided a pixel unit, an image processing unit that processes an image signal generated by the pixel unit, an encoding unit that encodes the image signal processed by the image processing unit, and an address assignment unit that assigns an address to a compressed signal encoded by the encoding unit. The pixel unit is provided on a first substrate. The image processing unit, the (Continued)

encoding unit, and the address assignment unit are provided on a second substrate to be stacked on the first substrate.

18 Claims, 6 Drawing Sheets

(51) Int. Cl.
*H04N 23/80* (2023.01)
*H04N 25/74* (2023.01)
*H04N 5/376* (2011.01)

(56) References Cited

U.S. PATENT DOCUMENTS

| | | | |
|---|---|---|---|
| 2003/0152038 A1* | 8/2003 | Oshima | H04L 61/103 370/252 |
| 2003/0179939 A1 | 9/2003 | Kim | |
| 2003/0184651 A1* | 10/2003 | Ohsawa | H04N 5/23216 348/207.1 |
| 2004/0179609 A1* | 9/2004 | Takahashi | H04N 19/167 375/E7.064 |
| 2008/0180540 A1 | 7/2008 | Kim et al. | |
| 2013/0021530 A1 | 1/2013 | Takhashi | |
| 2015/0281539 A1 | 10/2015 | Ueki et al. | |
| 2017/0188942 A1 | 7/2017 | Ghaffari et al. | |
| 2018/0226441 A1 | 8/2018 | Kondo | |
| 2018/0240797 A1 | 8/2018 | Yokoyama et al. | |

FOREIGN PATENT DOCUMENTS

| | | |
|---|---|---|
| JP | 2014-103543 A | 6/2014 |
| WO | 2012/032809 A1 | 3/2012 |
| WO | 2017/038403 A1 | 3/2017 |

OTHER PUBLICATIONS

International Search Report and Written Opinion of PCT Application No. PCT/JP2019/019193, dated Jul. 16, 2019, 07 pages of English Translation and 07 pages of ISRWO.

International Preliminary Report on Patentability of PCT Application No. PCT/JP2019/019193, dated Nov. 26, 2020, 07 pages of English Translation and 03 pages of IPRP.

Notice of Allowance for U.S. Appl. No. 17/052,700, dated Sep. 20, 2021, 8 pages.

Non-Final Office Action for U.S. Appl. No. 17/052,700, dated May 27, 2021, 12 pages.

\* cited by examiner

IMAGING DEVICE AND IMAGING SYSTEM HAVING A STACKED STRUCTURE FOR PIXEL PORTION AND SIGNAL PROCESSING CIRCUIT PORTION

CROSS REFERENCE TO RELATED APPLICATIONS

This application is a continuation application of U.S. patent application Ser. No. 17/052,700, filed on Nov. 3, 2020, which is a U.S. National Phase of International Patent Application No. PCT/JP2019/019193 filed on May 14, 2019, which claims priority benefit of Japanese Patent Application No. JP 2018-093445 filed in the Japan Patent Office on May 15, 2018. Each of the above-referenced applications is hereby incorporated herein by reference in its entirety.

TECHNICAL FIELD

The present technology relates to an imaging device and an imaging system, and particularly to an imaging device having a structure in which an upper pixel portion and a lower signal processing circuit portion are stacked and the like.

BACKGROUND ART

For example, Patent Document 1 discloses that an image sensor and an output interface are separately provided in a camera module. With such a configuration, the recent need for miniaturizing camera modules may not be satisfied.

CITATION LIST

Patent Document

Patent Document 1: International Publication No. 2012/032809

SUMMARY OF THE INVENTION

Problems to be Solved by the Invention

An object of the present technology is to effectively satisfy the need for miniaturizing camera modules.

Solutions to Problems

A concept of the present technology is directed to:
an imaging device including:
a pixel unit;
an image processing unit that processes an image signal generated by the pixel unit;
an encoding unit that encodes the image signal processed by the image processing unit; and
an address assignment unit that assigns an address to a compressed signal encoded by the encoding unit, in which
the pixel unit is provided on a first substrate, and
the image processing unit, the encoding unit, and the address assignment unit are provided on a second substrate to be stacked on the first substrate.

According to the present technology, the pixel unit is provided on the first substrate, and the image processing unit, the encoding unit, and the address assignment unit are provided on the second substrate to be stacked on the first substrate. The image signal generated by the pixel unit is processed by the image processing unit, and then encoded by the encoding unit. Then, the address assignment unit assigns an address to the encoded compressed signal.

As described above, according to the present technology, the image processing unit, the encoding unit, and the address assignment unit are provided on the second substrate, whereby the need for miniaturizing camera modules can be effectively satisfied.

Note that, in the present technology, an output unit that converts signals from the address assignment unit into output signals and outputs them to a network may be further included, and the output unit may be provided on the second substrate, for example. With this arrangement, it becomes possible to further miniaturize camera modules. Furthermore, in the present technology, a time synchronization function unit that communicates with an external device to set the time may be further included, and the time synchronization function unit may be provided on the second substrate, for example. With this arrangement, it becomes possible to perform highly accurate time synchronization with the external device, thereby enabling highly accurate synchronous control of the imaging timing.

Furthermore, another concept of the present technology is directed to:
an imaging system including:
an imaging device; and
an electronic control unit to be connected to the imaging device through a network, in which
the imaging device includes:
a pixel unit;
an image processing unit that processes an image signal generated by the pixel unit; an encoding unit that encodes the image signal processed by the image processing unit; and
an address assignment unit that assigns an address to a compressed signal encoded by the encoding unit,
the pixel unit is provided on a first substrate, and
the image processing unit, the encoding unit, and the address assignment unit are provided on a second substrate to be stacked on the first substrate.

Effects of the Invention

According to the present technology, it becomes possible to effectively satisfy the need for miniaturizing camera modules. Note that the effects described herein are not necessarily limited, and may be any of the effects described in the present disclosure.

MODE FOR CARRYING OUT THE INVENTION

Hereinafter, an embodiment for carrying out the invention (hereinafter referred to as an embodiment) will be described. Note that descriptions will be given in the following order.
1. Embodiment
2. Applications to Mobile Body
3. Variation <1. Embodiment>

[Exemplary Configuration of Imaging Device]

Figure 1:
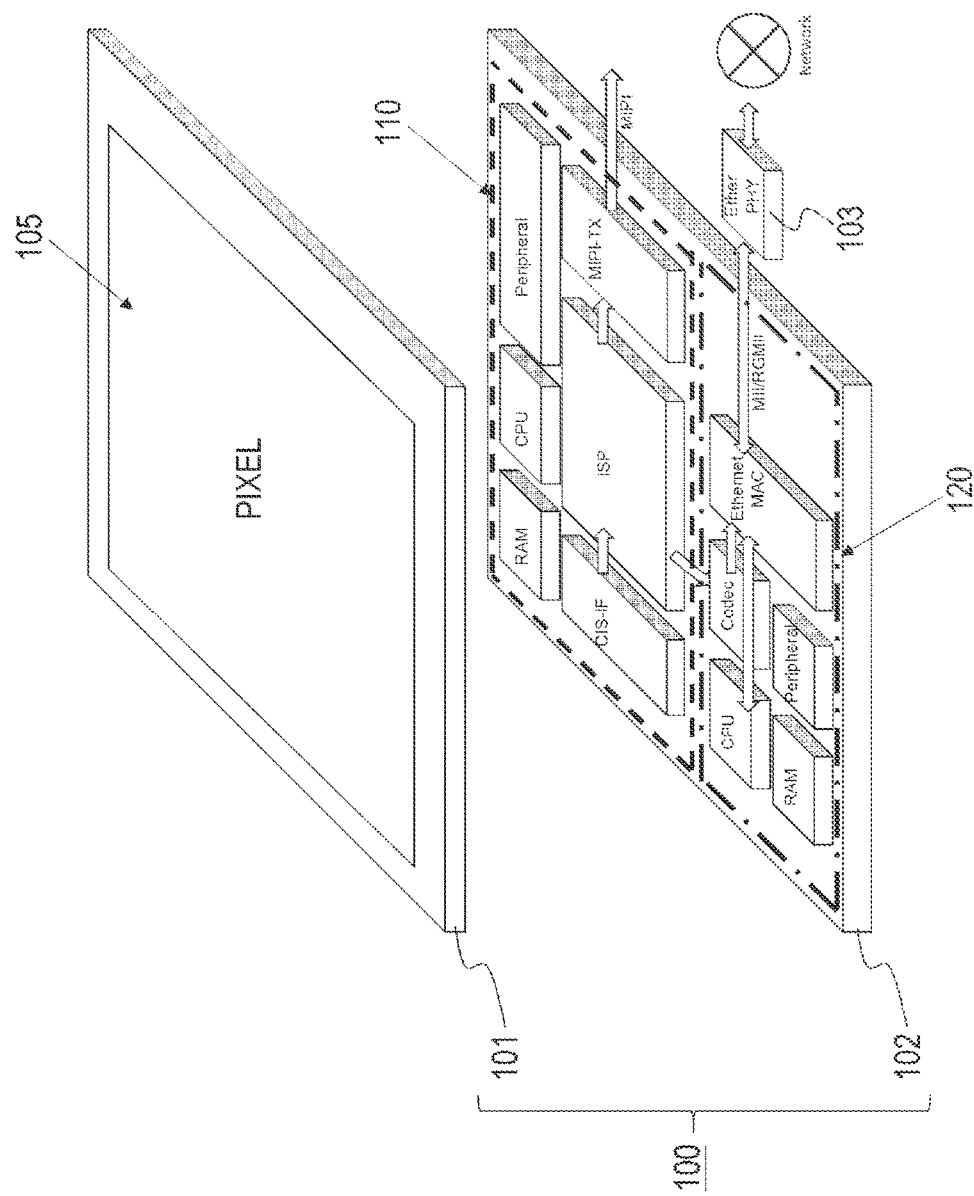
FIG. 1 is a diagram illustrating an exemplary configuration of an imaging device as an embodiment.

FIG. 1 illustrates an exemplary configuration of an imaging device 100 as an embodiment. The imaging device 100 includes an upper chip (first substrate) 101 and a lower chip (second substrate) 102, which are stacked. Note that the illustrated example shows the first chip 101 and the second chip 102 in a separated state for convenience of explanation.

A pixel unit 105 in which a plurality of pixels that performs photoelectric conversion is arranged in a matrix is provided on the upper chip 101. The upper chip 101 is formed using a complementary metal-oxide semiconductor (CMOS) image sensor (CIS) process. An image signal processor (ISP) unit 110, which is surrounded by a broken line box, and an Ethernet system unit 120, which is surrounded by a dash-dot line box, are provided on the lower chip 102. The lower chip 102 is formed using a universal logic process. Note that the "Ethernet" is a registered trademark.

The ISP unit 110 includes each unit such as a "central processing unit (CPU)", "random access memory (RAM)", "peripheral", "CIS-1F", "ISP", and "MIPI-TX." As is well known, the ISP unit 110 performs processing such as white balance adjustment, gain adjustment, distortion correction, and guideline superimposition on image signals obtained by the pixel unit 105, and outputs the processed image signals according to the serial data transmission standard of the mobile industry processor interface (MIPI).

The Ethernet system unit 120 includes each unit such as a "CPU", "RAM", "peripheral", "codec", and "Ethernet MAC". The Ethernet system unit 120 encodes the image signals having been processed by the "ISP" of the ISP unit 110, generates an Ethernet frame including encoded compressed signals, and outputs, to a physical layer (PHY) chip 103, the Ethernet frame using a method such as the interface standard of the media independent interface (MII) and its derived standard of the interface standard of the reduced gigabit media independent interface (RGMII).

The part of "codec" is a part that encodes the image signals having been processed by the "ISP" of the ISP unit 110. For example, encoding is carried out using a method such as MPEG-4, H264, H265, and Motion JPEG. Furthermore, the part of "Ethernet MAC" is a part that generates an Ethernet frame including encoded compressed signals by, for example, assigning a MAC address.

The PHY chip 103 converts the Ethernet frame transmitted from the part of "Ethernet MAC" of the Ethernet system unit 120 from logical signals into electrical signals to be actually transmitted, and transmits them to a network through an Ethernet cable.

The "CPU" of the Ethernet system unit 120 communicates with external devices through the Ethernet. In the present embodiment, the "CPU" communicates with an external device to set the time on the basis of the IEEE 802.1AS standard. In this sense, the "CPU" constitutes a time synchronization function unit.

Figure 2:
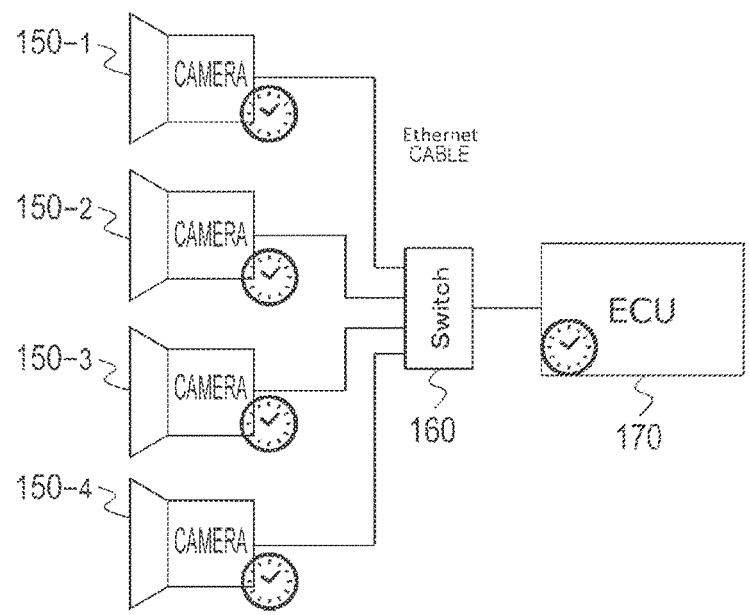
FIG. 2 is a diagram for explaining a time synchronization function of an Ethernet system unit.

FIG. 2 illustrates an imaging system in which four cameras (camera modules) 150-1 to 150-4 are connected to an electronic control unit (ECU) 170 via a switch (Ethernet switch) 160. Each of the cameras 150-1 to 150-4 includes the imaging device 100 and the PHY chip 103 illustrated in FIG. 1. The ECU 170 and the cameras 150-1 to 150-4 communicate with each other to set the time on the basis of the IEEE 802.1AS standard, thereby enabling highly accurate synchronous control of the imaging timing.

Figure 3:
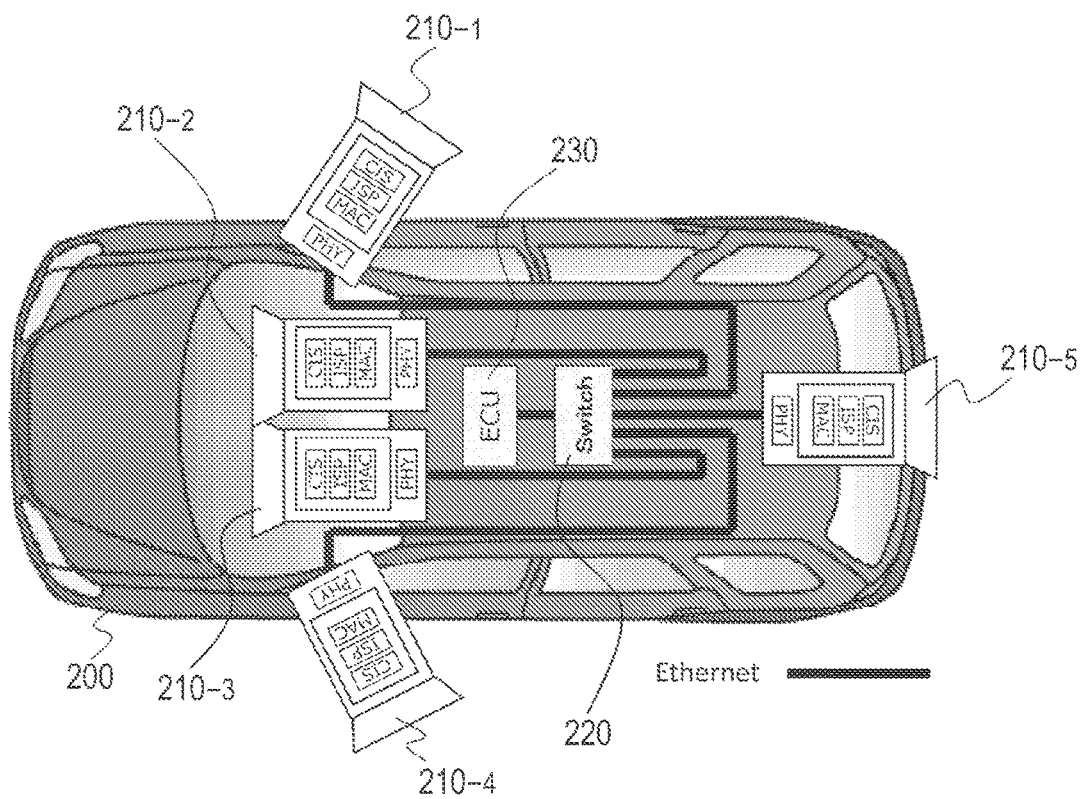
FIG. 3 is a diagram illustrating an exemplary configuration of an imaging system to which the imaging device of the embodiment is applied.

FIG. 3 illustrates an exemplary configuration of the imaging system. The imaging system is configured in such a manner that five cameras 210-1 to 210-5 are disposed on a vehicle 200, each of the cameras is connected to a switch (Ethernet switch) 220 through an Ethernet cable, and an ECU 230 is further connected to the switch 220. Each of the cameras 210-1 to 210-5 includes the imaging device 100 and the PHY chip 103 illustrated in FIG. 1. Note that the "CIS" indicates the pixel unit 105 provided on the upper chip 101, the "ISP" indicates the ISP unit 110 provided on the lower chip 102, and the "H264" indicates the Ethernet system unit 120 provided on the lower chip 102. Furthermore, the "PHY" indicates the PHY chip 103. A twisted pair cable may be applied as the Ethernet cable in the imaging system. This is similarly applied to the imaging system of FIG. 4 to be described below.

Figure 4:
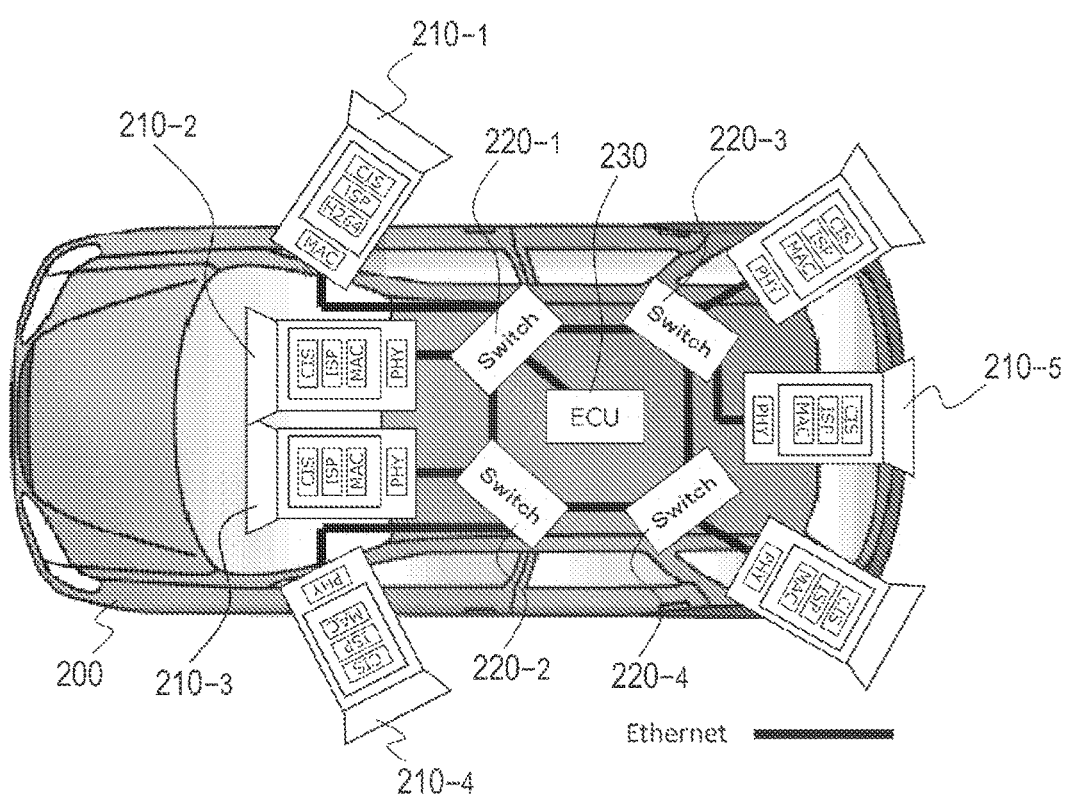
FIG. 4 is a diagram illustrating an exemplary configuration of another imaging system to which the imaging device of the embodiment is applied.

FIG. 4 illustrates another exemplary configuration of the imaging system. The imaging system is configured in such a manner that seven cameras 210-1 to 210-7 are disposed on the vehicle 200, each of the cameras is connected to any of switches (Ethernet switches) 220-1 to 220-4 through an Ethernet cable, and the ECU 230 is further connected to the switch 220-1. Each of the cameras 210-1 to 210-7 includes the imaging device 100 and the PHY chip 103 illustrated in FIG. 1. Note that the "CIS" indicates the pixel unit 105 provided on the upper chip 101, the "ISP" indicates the ISP unit 110 provided on the lower chip 102, and the "H264" indicates the Ethernet system unit 120 provided on the lower chip 102. Furthermore, the "PHY" indicates the PHY chip 103.

In the exemplary configuration of the imaging system of FIG. 4, a network includes the multiple switches 220-1 to 220-4, and each camera is connected to a switch existing in the vicinity thereof, whereby the length of the Ethernet cable between the camera and the switch can be shortened, and the wiring can be simplified even if the number of cameras increases.

As described above, in the imaging device 100 illustrated in FIG. 1, the Ethernet system unit 120 is provided on the lower chip 102 together with the ISP unit 110, whereby the need for miniaturizing camera modules can be effectively satisfied. Furthermore, in the imaging device 100 illustrated in FIG. 1, the "CPU" of the Ethernet system unit 120 includes a time synchronization function unit that communicates with an external device to set the time, whereby highly accurate time synchronization can be performed with the external device.

<2. Applications to Mobile Body>

The technology according to the present disclosure (present technology) can be applied to various products. For example, the technology according to the present disclosure may be implemented as a device to be mounted on any type of mobile body such as a vehicle, electric vehicle, hybrid electric vehicle, motorcycle, bicycle, personal mobility, airplane, drone, ship, and robot.

Figure 5:
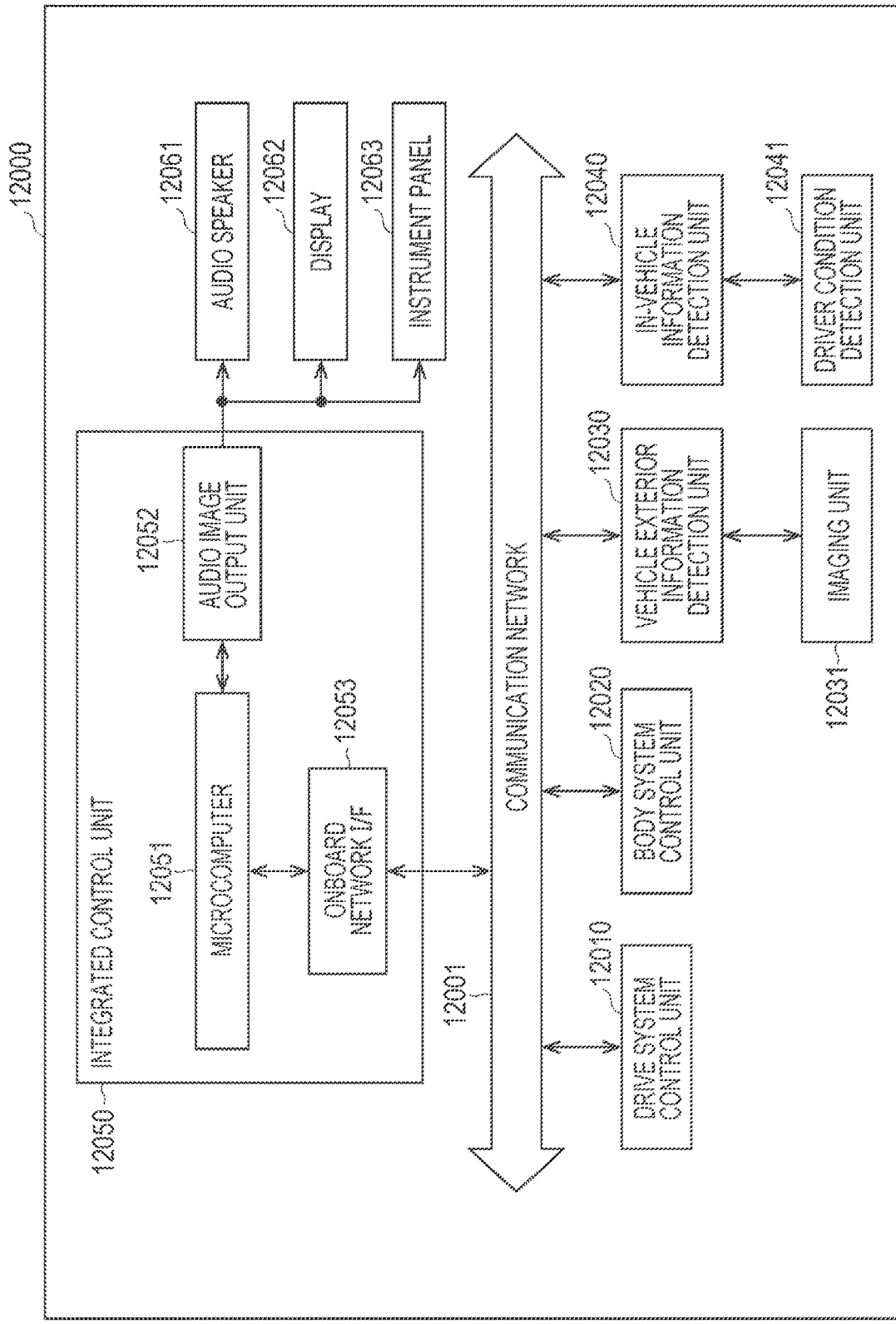
FIG. 5 is a block diagram illustrating an exemplary schematic configuration of a vehicle control system.

FIG. 5 is a block diagram illustrating a schematic exemplary configuration of a vehicle control system as an example of a mobile body control system to which the technology according to the present disclosure can be applied.

A vehicle control system 12000 includes a plurality of electronic control units connected via a communication network 12001. In the example illustrated in FIG. 5, the vehicle control system 12000 includes a drive system control unit 12010, a body system control unit 12020, a vehicle exterior information detection unit 12030, an in-vehicle information detection unit 12040, and an integrated control unit 12050. Furthermore, as a functional configuration of the integrated control unit 12050, a microcomputer 12051, an audio image output unit 12052, and an onboard network interface (I/F) 12053 are illustrated in the drawing.

The drive system control unit 12010 controls operation of a device related to a drive system of a vehicle according to various programs. For example, the drive system control unit 12010 functions as a control device of a driving force generation device for generating driving force of a vehicle such as an internal-combustion engine and a driving motor, a driving force transmission mechanism for transmitting driving force to wheels, a steering mechanism for adjusting a steering angle of a vehicle, a braking device for generating braking force of a vehicle, and the like.

The body system control unit 12020 controls operation of various devices installed on a vehicle body according to various programs. For example, the body system control unit 12020 functions as a control device of a keyless entry system, a smart key system, a power window device, or various lamps such as a head lamp, a back lamp, a brake lamp, a turn indicator, and a fog lamp. In this case, radio waves transmitted from a portable device substituted for a key or signals of various switches may be input to the body system control unit 12020. The body system control unit 12020 receives input of those radio waves or the signals, and controls a door lock device, a power window device, a lamp, and the like of a vehicle.

The vehicle exterior information detection unit 12030 detects information regarding the outside of the vehicle on which the vehicle control system 12000 is installed. For example, an imaging unit 12031 is connected to the vehicle exterior information detection unit 12030. The vehicle exterior information detection unit 12030 causes the imaging unit 12031 to capture an image of the outside of the vehicle, and receives the captured image. The vehicle exterior information detection unit 12030 may perform, on the basis of the received image, detection processing of an object such as a person, a vehicle, an obstacle, a sign, and a character on a road, or distance detection processing.

The imaging unit 12031 is an optical sensor that receives light and outputs electric signals corresponding to the amount of the received light. The imaging unit 12031 may output the electric signals as an image, or as information regarding the distance measurement. Furthermore, the light received by the imaging unit 12031 may be visible light, or may be invisible light such as infrared rays.

The in-vehicle information detection unit 12040 detects information regarding the inside of the vehicle. For example, a driver condition detection unit 12041 for detecting condition of a driver is connected to the in-vehicle information detection unit 12040. The driver condition detection unit 12041 includes, for example, a camera for imaging the driver, and the in-vehicle information detection unit 12040 may calculate a fatigue degree or a concentration degree of the driver or may determine whether or not the driver is dozing off on the basis of the detected information input from the driver condition detection unit 12041.

The microcomputer 12051 is capable of calculating a control target value of the driving force generation device, the steering mechanism, or the braking device on the basis of the information regarding the outside/inside of the vehicle obtained by the vehicle exterior information detection unit 12030 or the in-vehicle information detection unit 12040, and outputting a control command to the drive system control unit 12010. For example, the microcomputer 12051 is capable of performing cooperative control aiming at implementation of a function of the advanced driver assistance system (ADAS) including collision avoidance or impact mitigation of the vehicle, following travel based on the distance between vehicles, vehicle speed maintenance travelling, vehicle collision warning, vehicle lane departure warning, and the like.

Furthermore, the microcomputer 12051 controls the driving force generation device, the steering mechanism, the braking device, or the like on the basis of the information regarding the surroundings of the vehicle obtained by the vehicle exterior information detection unit 12030 or the in-vehicle information detection unit 12040, whereby cooperative control aiming at autonomous driving for autonomously travelling without being dependent on the operation of the driver and the like can be performed.

Furthermore, the microcomputer 12051 is capable of outputting a control command to the body system control unit 12030 on the basis of the information regarding the outside of the vehicle obtained by the vehicle exterior information detection unit 12030. For example, the microcomputer 12051 is capable of performing cooperative control aiming at anti-glaring such as switching from the high beam to the low beam by controlling the head lamp according to the position of a leading vehicle or an oncoming vehicle detected by the vehicle exterior information detection unit 12030.

The audio image output unit 12052 transmits at least one of output signals of audio or an image to an output device capable of visually or audibly notifying an occupant of the vehicle or the outside of the vehicle of information. In the example of FIG. 5, an audio speaker 12061, a display 12062, and an instrument panel 12063 are exemplified as the output device. The display 12062 may include, for example, at least one of an onboard display or a head-up display.

Figure 6:
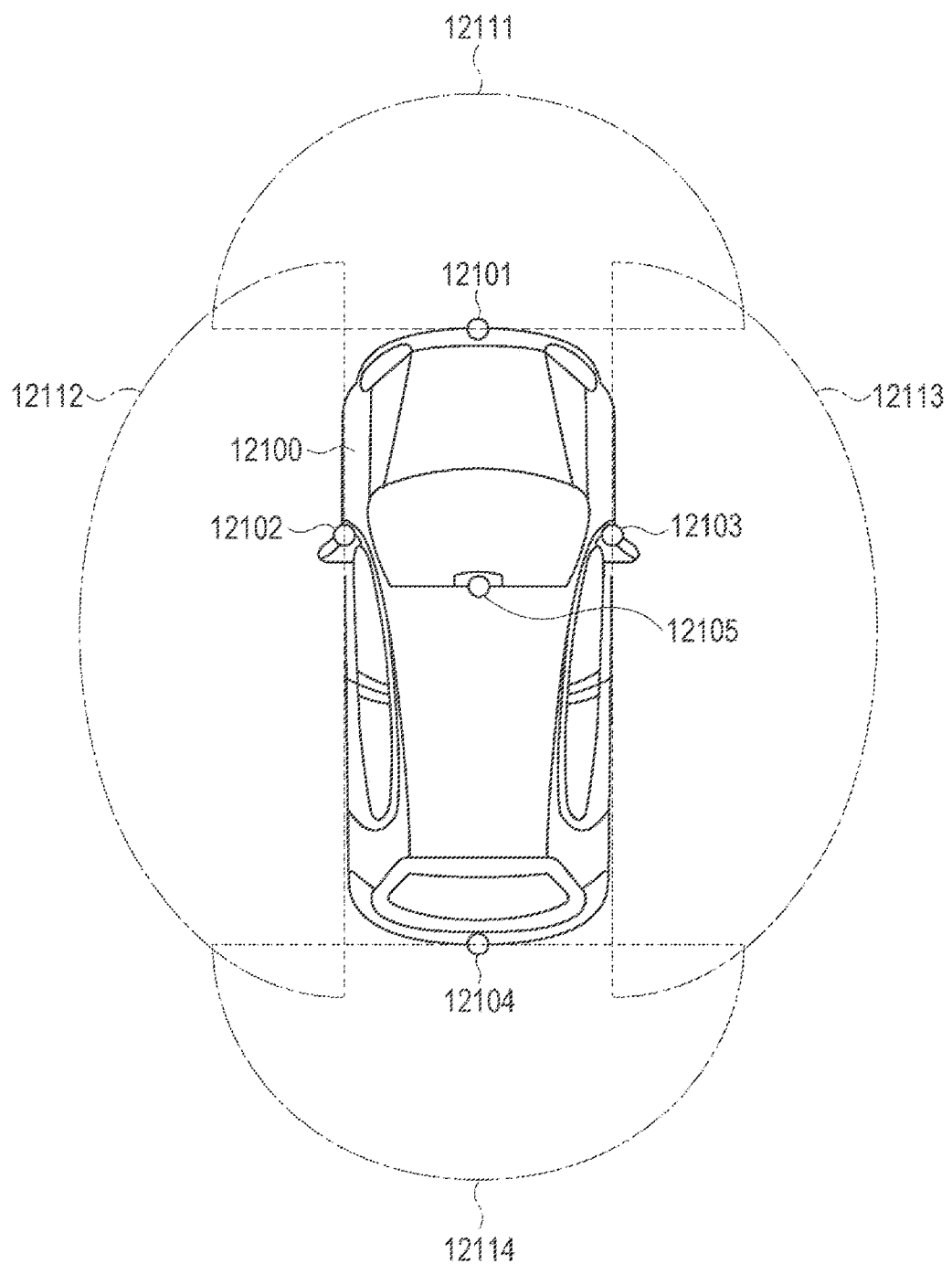
FIG. 6 is an explanatory diagram illustrating exemplary positions for installing a vehicle exterior information detection unit and an imaging unit.

FIG. 6 is a diagram illustrating an example of an installation position of the imaging unit 12031.

In FIG. 6, as the imaging unit 12031, imaging units 12101, 12102, 12103, 12104, and 12105 are included.

The imaging units 12101, 12102, 12103, 12104, and 12105 are provided at, for example, a position such as a front nose, a side mirror, a rear bumper, a back door, and an upper portion of a vehicle interior windshield of a vehicle 12100. The imaging unit 12101 provided on the front nose and the imaging unit 12105 provided on the upper portion of the vehicle interior windshield mainly obtain an image in front of the vehicle 12100. The imaging units 12102 and 12103 provided on the side mirrors mainly obtain an image of the lateral sides of the vehicle 12100. The imaging unit 12104 provided on the rear bumper or the back door mainly obtains an image behind the vehicle 12100. The imaging unit 12105 provided on the upper portion of the vehicle interior windshield is mainly used for detecting a leading vehicle, a pedestrian, an obstacle, a traffic signal, a traffic sign, a lane, and the like.

Note that an exemplary imaging range of the imaging units 12101 to 12104 is illustrated in FIG. 6. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, image data captured by the imaging units 12101 to 12104 are superimposed, whereby an overhead image of the vehicle 12100 viewed from above can be obtained.

At least one of the imaging units 12101 to 12104 may have a function of obtaining distance information. For example, at least one of the imaging units 12101 to 12104 may be a stereo camera including a plurality of image pickup devices, or may be an image pickup device having pixels for detecting a phase difference.

For example, the microcomputer 12051 calculates, on the basis of the distance information obtained from the imaging units 12101 to 12104, a distance to each three-dimensional object within the imaging ranges 12111 to 12114 and a temporal change of the distance (relative speed with respect to the vehicle 12100), whereby particularly a three-dimensional object traveling at a predetermined speed (e.g., 0 km/h or more) in substantially the same direction as the vehicle 12100, which is the closest three-dimensional object on the traveling path of the vehicle 12100, can be extracted as a leading vehicle. Moreover, the microcomputer 12051 can perform automatic brake control (including following travel stop control), automatic acceleration control (including following travel start control), and the like by setting the distance between vehicles to be secured in advance before a leading vehicle. In this manner, the cooperative control aiming at the autonomous driving for autonomously travelling without being dependent on the operation of the driver and the like can be performed.

For example, the microcomputer 12051 can extract, on the basis of the distance information obtained from the imaging units 12101 to 12104, three-dimensional object data related to a three-dimensional object after dividing it into a motorcycle, an ordinary car, a large vehicle, a pedestrian, and other three-dimensional objects such as a utility pole, which can be used for automatic avoidance of obstacles. For example, the microcomputer 12051 distinguishes obstacles around the vehicle 12100 as an obstacle that can be visually recognized by the driver of the vehicle 12100 and an obstacle less likely to be visually recognized. Then, the microcomputer 12051 determines a collision risk indicating a degree of risk of collision with each obstacle, and in a case where the collision risk is equal to or more than a set value and there is a possibility of collision, a warning is output to the driver via the audio speaker 12061 or the display 12062, or forced deceleration or avoidance steering is performed via the drive system control unit 12010, whereby driving support for avoiding collision can be performed.

At least one of the imaging units 12101 to 12104 may be an infrared camera for detecting infrared rays. For example, the microcomputer 12051 can recognize a pedestrian by determining whether or not the pedestrian exists in the image captured by the imaging units 12101 to 12104. Such recognition of the pedestrian is performed through, for example, a procedure of extracting characteristic points in the image captured by the imaging units 12101 to 12104 as infrared cameras, and a procedure of performing pattern matching processing on a series of characteristic points indicating the outline of the object to determine whether or not it is a pedestrian. When the microcomputer 12051 determines that a pedestrian exists in the image captured by the imaging units 12101 to 12104 and the pedestrian is recognized, the audio image output unit 12052 controls the display 12062 in such a manner that a square outline for emphasizing the recognized pedestrian is displayed in a superimposed manner. Furthermore, the audio image output unit 12052 may control the display 12062 in such a manner that an icon or the like indicating the pedestrian is displayed at a desired position.

An exemplary vehicle control system to which the technology according the present disclosure can be applied has been described above. The technology according to the present disclosure can be applied to the imaging unit 12031 in the configuration described above. With the technology according to the present disclosure being applied to the imaging unit 12031, the need for miniaturizing camera modules can be effectively satisfied.

<3. Variation>

Figure 7:
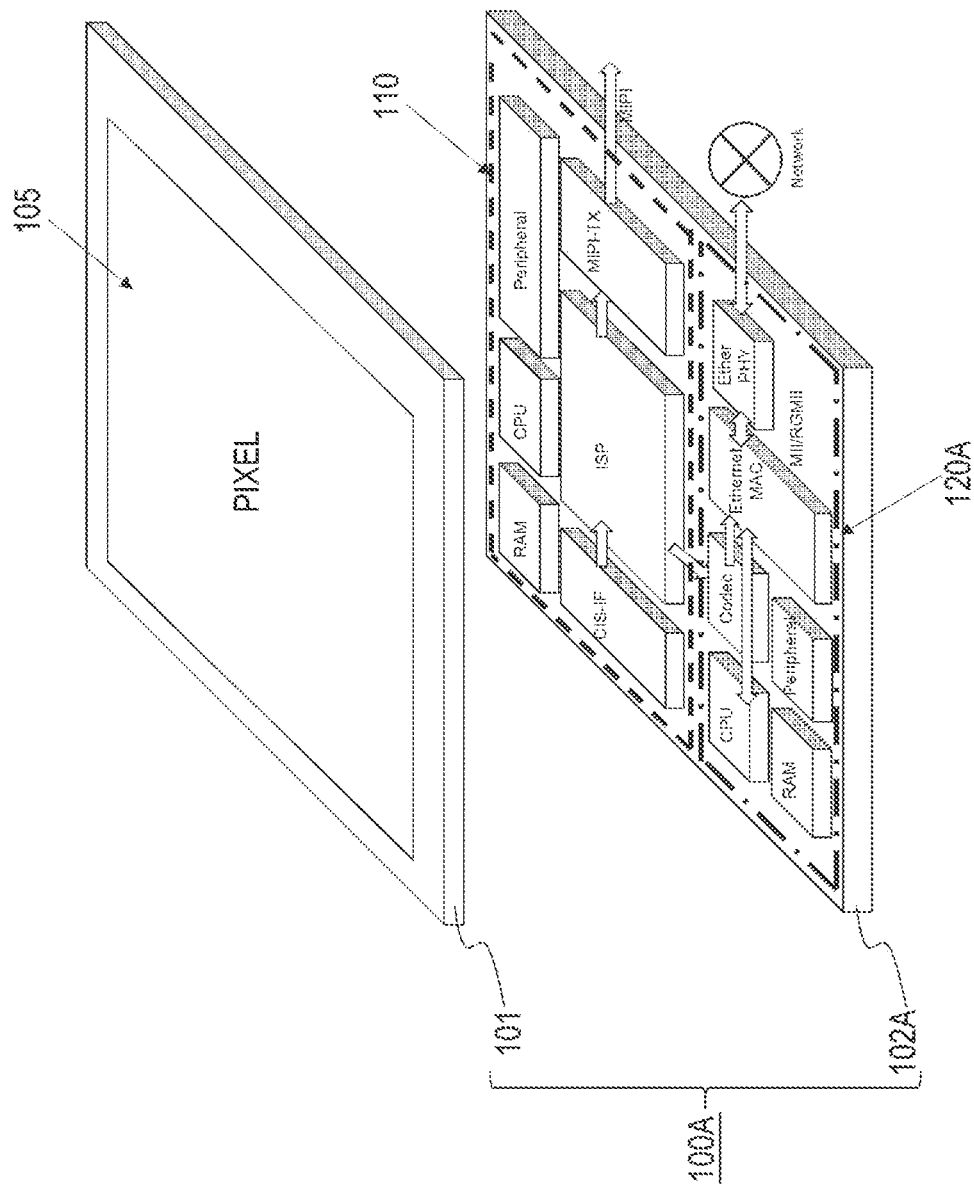
FIG. 7 is a diagram illustrating another exemplary configuration of the imaging device.

Note that the embodiment illustrated in FIG. 1 shows an exemplary case where the PHY chip 103 exists separately from the imaging device 100. It is also conceivable to provide a part having a function equivalent to that of the PHY chip 103 on the lower chip 102. FIG. 7 illustrates an exemplary configuration of an imaging device 100A in such a case. In FIG. 7, parts corresponding to those in FIG. 1 are denoted by the same reference signs, and detailed descriptions thereof will be omitted as appropriate. The imaging device 100A includes an upper chip (first substrate) 101 and a lower chip (second substrate) 102A, which are stacked. Note that the illustrated example shows the first chip 101 and the second chip 102A in a separated state for convenience of explanation.

A pixel unit 105 in which a plurality of pixels that performs photoelectric conversion is arranged in a matrix is provided on the upper chip 101. An image signal processor (ISP) unit 110, which is surrounded by a broken line box, and an Ethernet system unit 120A, which is surrounded by a dash-dot line box, are provided on the lower chip 102A.

The Ethernet system unit 120A includes each unit such as a "CPU", "RAM", "peripheral", "codec", "Ethernet MAC", and "Ether PHY". The "Ether PHY" is a part having a function equivalent to that of the PHY chip 103. The part of "Ether PHY" converts the Ethernet frame transmitted from the part of "Ethernet MAC" from logical signals into electrical signals to be actually transmitted, and transmits them to a network through an Ethernet cable.

In this manner, with the part having the function equivalent to that of the PHY chip 103 being provided on the lower chip 102A, it becomes possible to further miniaturize camera modules.

Furthermore, although the preferred embodiments of the present disclosure have been described in detail with reference to the accompanying drawings, the technical scope of the present disclosure is not limited to such examples. It is obvious that those skilled in the art in the technical field of the present disclosure may find various alterations and modifications within the technical ideas of the appended claims, and it should be understood that such alterations and modifications are also naturally within the technical scope of the present disclosure.

Furthermore, the present technology can also take the following configurations.

(1) An imaging device including:
a pixel unit;
an image processing unit that processes an image signal generated by the pixel unit;
an encoding unit that encodes the image signal processed by the image processing unit; and
an address assignment unit that assigns an address to a compressed signal encoded by the encoding unit, in which the pixel unit is provided on a first substrate, and the image processing unit, the encoding unit, and the address assignment unit are provided on a second substrate to be stacked on the first substrate.

(2) The imaging device according to (1) described above, further including:

an output unit that converts a signal from the address assignment unit into an output signal and outputs the output signal to a network, in which the output unit is provided on the second substrate.

(3) The imaging device according to (1) or (2) described above, further including:

a time synchronization function unit that communicates with an external device to set time, in which the time synchronization function unit is provided on the second substrate.

(4) An imaging system including:

an imaging device; and an electronic control unit to be connected to the imaging device through a network, in which the imaging device includes:

a pixel unit;

an image processing unit that processes an image signal generated by the pixel unit;

an encoding unit that encodes the image signal processed by the image processing unit; and an address assignment unit that assigns an address to a compressed signal encoded by the encoding unit, the pixel unit is provided on a first substrate, and the image processing unit, the encoding unit, and the address assignment unit are provided on a second substrate to be stacked on the first substrate.

REFERENCE SIGNS LIST 100, 100A Imaging device
101 Upper chip (First substrate)
102, 102A Lower chip (Second substrate)
103 PHY chip
105 Pixel unit
110 ISP unit
120, 120A Ethernet system unit
150-1 to 150-4 Camera (Camera module)
160 Switch (Ethernet switch)
170 ECU
200 Vehicle
210-1 to 210-7 Camera (Camera module)
220, 220-1 to 220-4 Switch (Ethernet switch)
230 ECU

What is claimed is:

1. An imaging device, comprising:
   a plurality of pixels on a first substrate, wherein the plurality of pixels is configured to generate an image signal;
   first circuitry on a second substrate stacked on the first substrate, wherein the first circuitry is configured to:
      process the image signal to generate a processed image signal; and
      output the processed image signal through a first data interface;
   second circuitry on the second substrate, wherein the second circuitry is configured to:
      encode the processed image signal to generate an encoded compressed signal;
      assign an address to the encoded compressed signal to generate an Ethernet frame that includes the encoded compressed signal; and
      output the Ethernet frame through a second data interface.

2. The imaging device according to claim 1, wherein the first data interface is a mobile industry processor interface (MIPI).

3. The imaging device according to claim 1, wherein the second data interface is one of a media independent interface (MII) or a reduced gigabit media independent interface (RGMII).

4. The imaging device according to claim 1, further comprising a physical layer chip on the second substrate, wherein
   the physical layer chip is configured to transmit the Ethernet frame to a network,
   the physical layer chip is configured to communicate with an external Ethernet switch, and
   the second circuitry is configured to communicate with an external device via the external Ethernet switch.

5. The imaging device according to claim 4, wherein the physical layer chip, on the second substrate, is further configured to convert the Ethernet frame from logical signals to electrical signals for the transmission of the Ethernet frame to the network.

6. The imaging device according to claim 1, wherein the second circuitry is further configured to:
   convert the encoded compressed signal into an output electrical signal subsequent to the assignment of the address; and
   output the output electrical signal.

7. The imaging device according to claim 1, wherein the second circuitry is further configured to:
   set a time based on a determined standard; and
   communicate in synchronization with an external device based on the set time.

8. The imaging device according to claim 7, wherein the determined standard comprises IEEE 802.1AS standard.

9. The imaging device according to claim 1, wherein the first circuitry is further configured to perform at least one of a white balance adjustment, a gain adjustment, or a distortion correction on the image signal.

10. The imaging device according to claim 1, wherein the first circuitry is further configured to superimpose a guideline signal on the generated image signal.

11. The imaging device according to claim 1, wherein the first circuitry is further configured to output the processed image signal through the first data interface without compression.

12. The imaging device according to claim 1, wherein the second circuitry is further configured to encode the processed image signal based on one of a MPEG-4 standard, a H264 standard, a H265 standard, or a motion JPEG standard.

13. The imaging device according to claim 1, wherein the address is a MAC address.

14. The imaging device according to claim 1, wherein the imaging device is mounted on a vehicle.

15. An imaging system, comprising:
    an imaging device;
    an Ethernet switch coupled to the imaging device through a network; and
    an electronic control unit coupled to the Ethernet switch, wherein the imaging device includes:
       a plurality of pixels on a first substrate, wherein the plurality of pixels is configured to generate an image signal;
       first circuitry on a second substrate stacked on the first substrate, wherein the first circuitry is configured to:

process the image signal to generate a processed image signal; and output the processed image signal through a first data interface;

second circuitry on the second substrate, wherein the second circuitry is configured to:

encode the processed image signal to generate an encoded compressed signal;

assign an address to the encoded compressed signal to generate an Ethernet frame that includes the encoded compressed signal; and output the Ethernet frame through a second data interface.

16. The imaging system according to claim 15, further comprising a physical layer chip configured to transmit the Ethernet frame to the network, wherein the physical layer chip is configured to communicate with the Ethernet switch, and the second circuitry is configured to communicate with the electronic control unit via the Ethernet switch.

17. The imaging system according to claim 15, wherein the first data interface is a mobile industry processor interface (MIPI).

18. The imaging system according to claim 15, wherein the second data interface is one of a media independent interface (MII) or a reduced gigabit media independent interface (RGMII).

* * * * *